(12) United States Patent
Seo et al.

(10) Patent No.: US 7,801,412 B2
(45) Date of Patent: Sep. 21, 2010

(54) RECORDING MEDIUM HAVING DATA STRUCTURE FOR MANAGING REPRODUCTION OF MULTIPLE REPRODUCTION PATH VIDEO DATA RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR); Hyung Sun Kim, Seoul (KR); Mi Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1470 days.

(21) Appl. No.: 10/807,141

(22) Filed: Mar. 24, 2004

(65) Prior Publication Data
US 2004/0240848 A1    Dec. 2, 2004

(30) Foreign Application Priority Data
Mar. 24, 2003  (KR) .................. 10-2003-0018175

(51) Int. Cl.
*H04N 5/93* (2006.01)
(52) U.S. Cl. ..................... 386/69; 386/95; 386/125
(58) Field of Classification Search .............. 386/95, 386/125, 69
See application file for complete search history.

(56) References Cited

U.S. PATENT DOCUMENTS

| 5,691,972 | A  | * | 11/1997 | Tsuga et al. ............. 369/275.3 |
| 5,915,067 | A  | * | 6/1999  | Nonomura et al. ............ 386/70 |
| 6,185,365 | B1 | * | 2/2001  | Murase et al. ................ 386/95 |
| 6,643,450 | B1 | * | 11/2003 | deCarmo ..................... 386/94 |

* cited by examiner

*Primary Examiner*—Thai Tran
*Assistant Examiner*—Girumsew Wendmagegn
(74) *Attorney, Agent, or Firm*—Harness, Dickey & Pierce, P.L.C.

(57) ABSTRACT

The present invention relates to a data structure for managing reproduction of at least video data having multiple reproduction paths through title structure. A recording medium having a data structure according to the present invention comprises a data area storing multi-path video data; and a management information area storing title management information to assign a plurality of titles to the multi-path video data, wherein the title management information includes at least one title block that is composed of an entry title and at least one non-entry title that are associated with mutually different reproduction paths.

20 Claims, 7 Drawing Sheets

RECORDING MEDIUM HAVING DATA STRUCTURE FOR MANAGING REPRODUCTION OF MULTIPLE REPRODUCTION PATH VIDEO DATA RECORDED THEREON AND RECORDING AND REPRODUCING METHODS AND APPARATUSES

FOREIGN PRIORITY

The present invention claims priority under 35 U.S.C. 119 on Korean Application No. 10-2003-018175 filed Mar. 24, 2003; the contents of which are incorporated by reference in their entirety.

BACKGROUND OF THE INVENTION

1. Field of the Invention

The present invention relates to a recording medium having a data structure for managing reproduction of at least video data having multiple reproduction paths recorded thereon through title structure as well as methods and apparatuses for reproduction and recording the data structure.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) is one example of these new optical disks.

Figure 1:
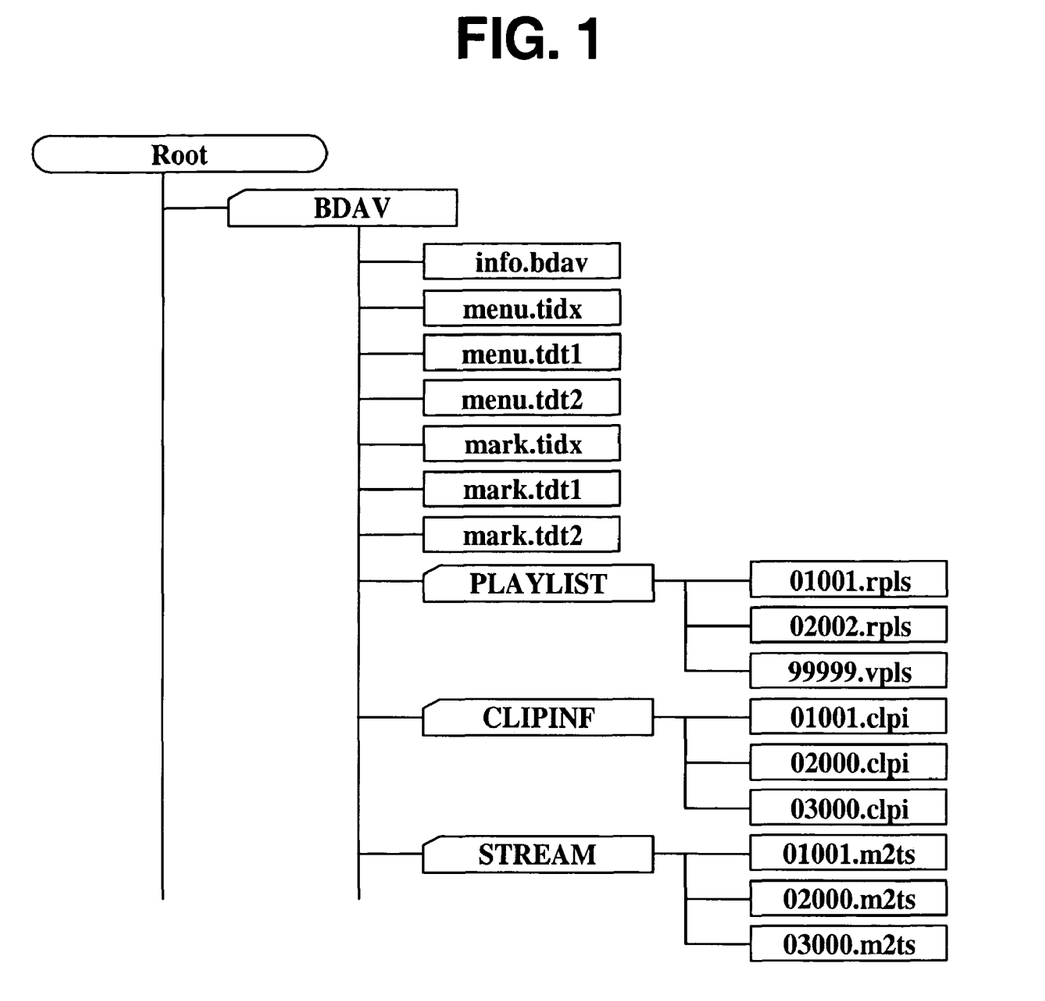
FIG. 1 illustrates the prior art file or data structure of a rewritable optical disk according to the Blu-ray Disc REwritable (BD-RE) standard.

FIG. 1 illustrates the file structure of the BD-RE. The file structure or data structure provides for managing the reproduction of the video and audio data recorded on the BD-RE. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RE data structure and disk format as illustrated in FIG. 1 is well-known and readily available, only a brief overview of the file structure will be provided in this disclosure.

As alluded to above, the STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips.

The CLIPINF directory includes a clip information file associated with each A/V stream file. The clip information file indicates, among other things, the type of A/V stream associated therewith, number of source packets in the A/V stream associated therewith, and timing information of the source packets in the A/V stream associated therewith (e.g., on an arrival time basis (ATC) and/or a system time basis (STC)).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., ATC or STC basis). Expressed another way, the playlist file identifies playitems, each playitem points to a clip or portion thereof and identifies the clip file associated with the clip.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the files names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing reproduction of video and audio data, especially multiple parental level video and audio data recorded on the high-density read-only optical disk such as a BD-ROM is not yet available.

SUMMARY OF THE INVENTION

It is an object of the present invention to provide a recording medium having a data structure for managing reproduction of multiple reproduction path video data recorded thereon through title structures, and methods and apparatuses for recording and reproducing the video data on such a recording medium.

A recording medium having a data structure according to the present invention comprises a data area storing multi-path video data; and a management information area storing title management information to assign a plurality of titles to the multi-path video data, wherein the title management information includes at least one title block that is composed of an entry title and at least one non-entry title, and wherein the titles pertaining to the title block are associated with mutually different reproduction paths.

In one embodiment, the multi-path video data is video data having multiple parental levels.

The present invention further provides apparatuses and methods for recording and reproducing the data structure according to the present invention, and recording and reproducing multiple reproduction path video data according to the present invention.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In order that the invention may be fully understood, preferred embodiments thereof will now be described with reference to the accompanying drawings.

Figure 2:
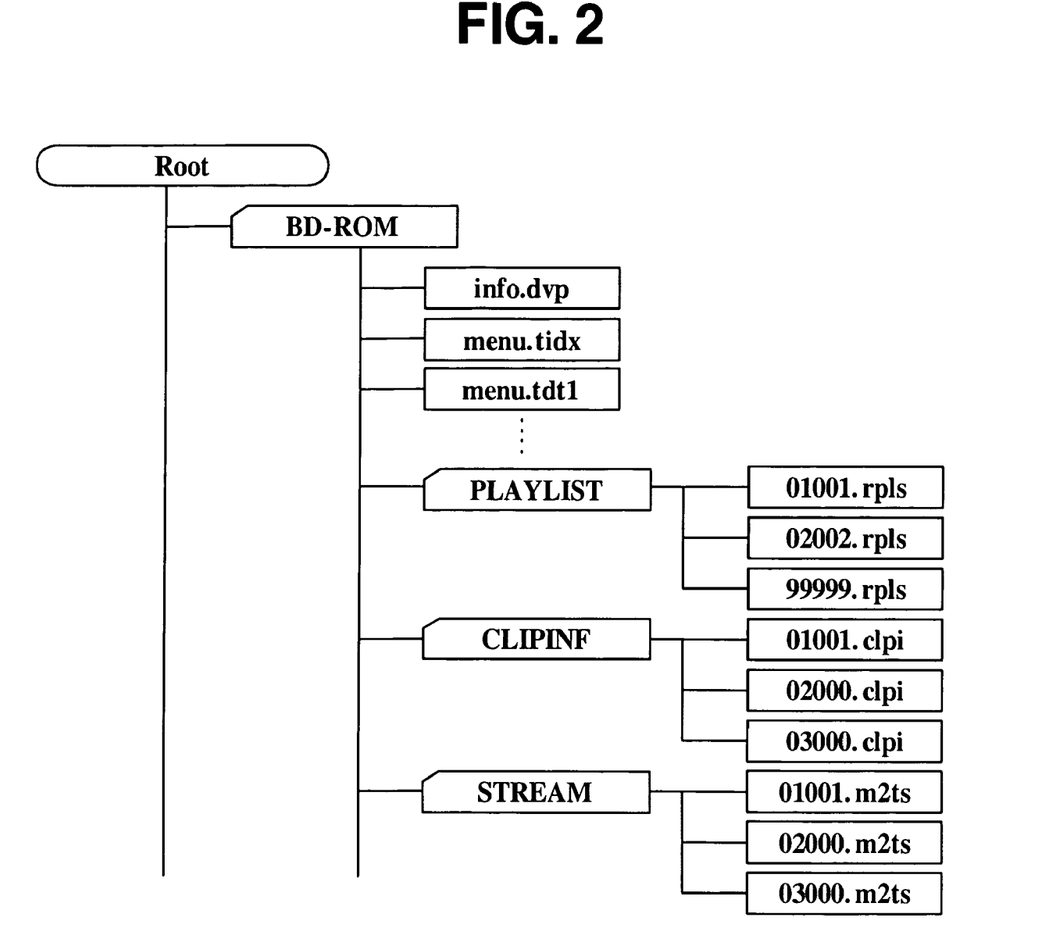
FIG. 2 illustrates an exemplary embodiment of a recording medium file or data structure according to the present invention.

A high-density optical disk, for example, a Blu-Ray ROM (BD-ROM) in accordance with the invention may have a file or data structure for managing reproduction of video and audio data as shown in FIG. 2. Many aspects of the data structure according to the present invention shown in FIG. 2 are similar to that of the BD-RE standard discussed with respect to FIG. 1. As such these aspects will not be described in great detail.

As shown in FIG. 2, the root directory contains at least one BD-ROM directory. The BD-ROM directory includes a general information file info.dvp, menu files menu.tidx, menu.tdtl among others, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID (s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.dvp file is a general information file that provides general information for managing the reproduction of the A/V streams recorded on the optical disk. More specifically, the info.dvp file includes, among other things, a table of playlists that identifies the file names of the playlists in the PLAYLIST directory.

Figure 3:
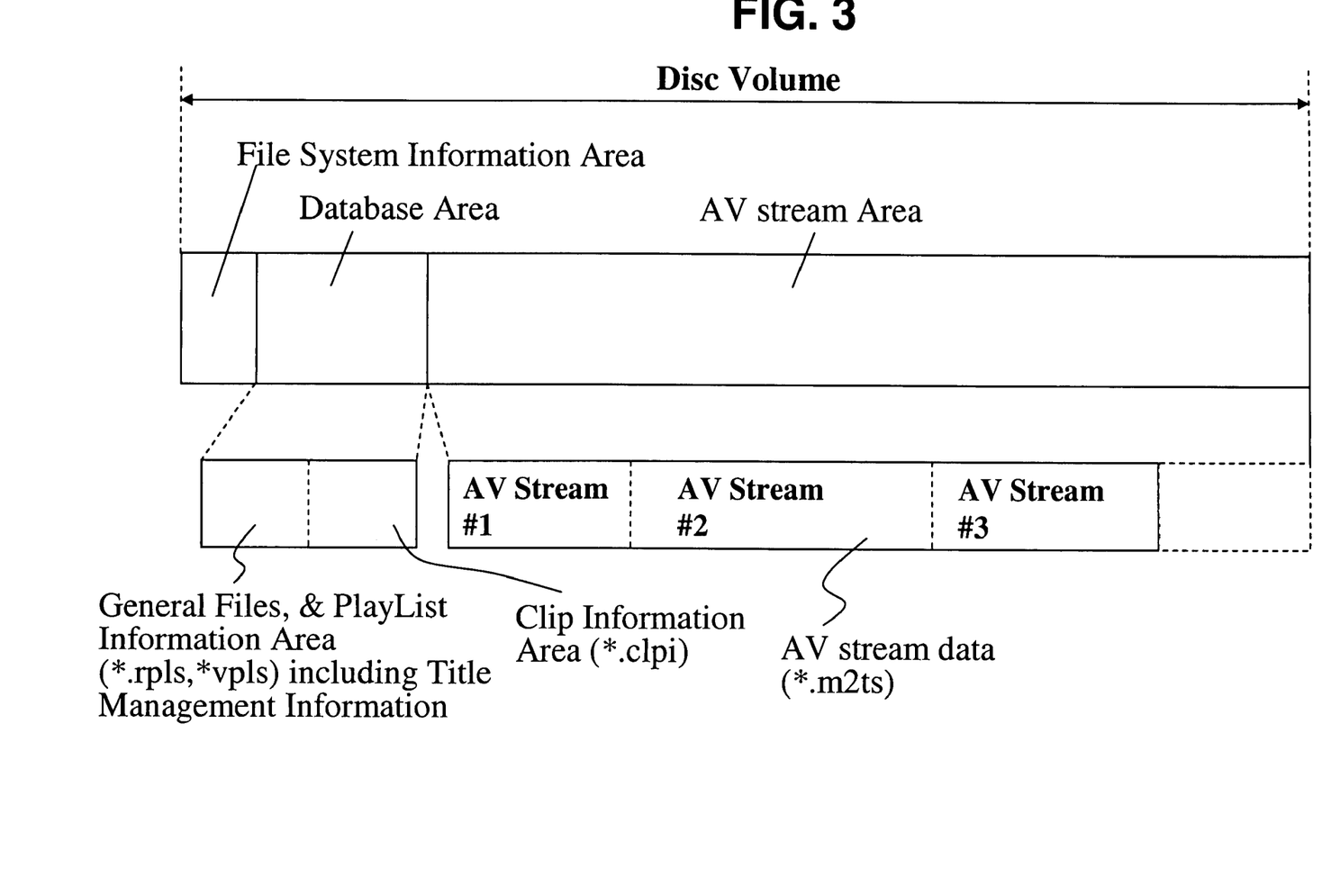
FIG. 3 illustrates an example of a recording medium having the data structure of FIG. 2 stored thereon.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area.

The data base area includes a general information file and playlist and title management information area and a clip information area. The general information file and playlist and title management information area have the general information file recorded in a general information file area thereof, management information of titles, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles. However, video and audio data having multiple reproduction paths, e.g., multiple parental levels are organized as multiple titles according to the present invention.

As will be described in detail below with respect to embodiments of the present invention, the data structures according to the present invention include title management information and/or navigation information for managing reproduction of multiple reproduction path video data recorded on the recording medium.

The data structures writing according to the present invention may be applicable to the manufacturing process in case of a read-only disk like BD-ROM.

Figure 4:
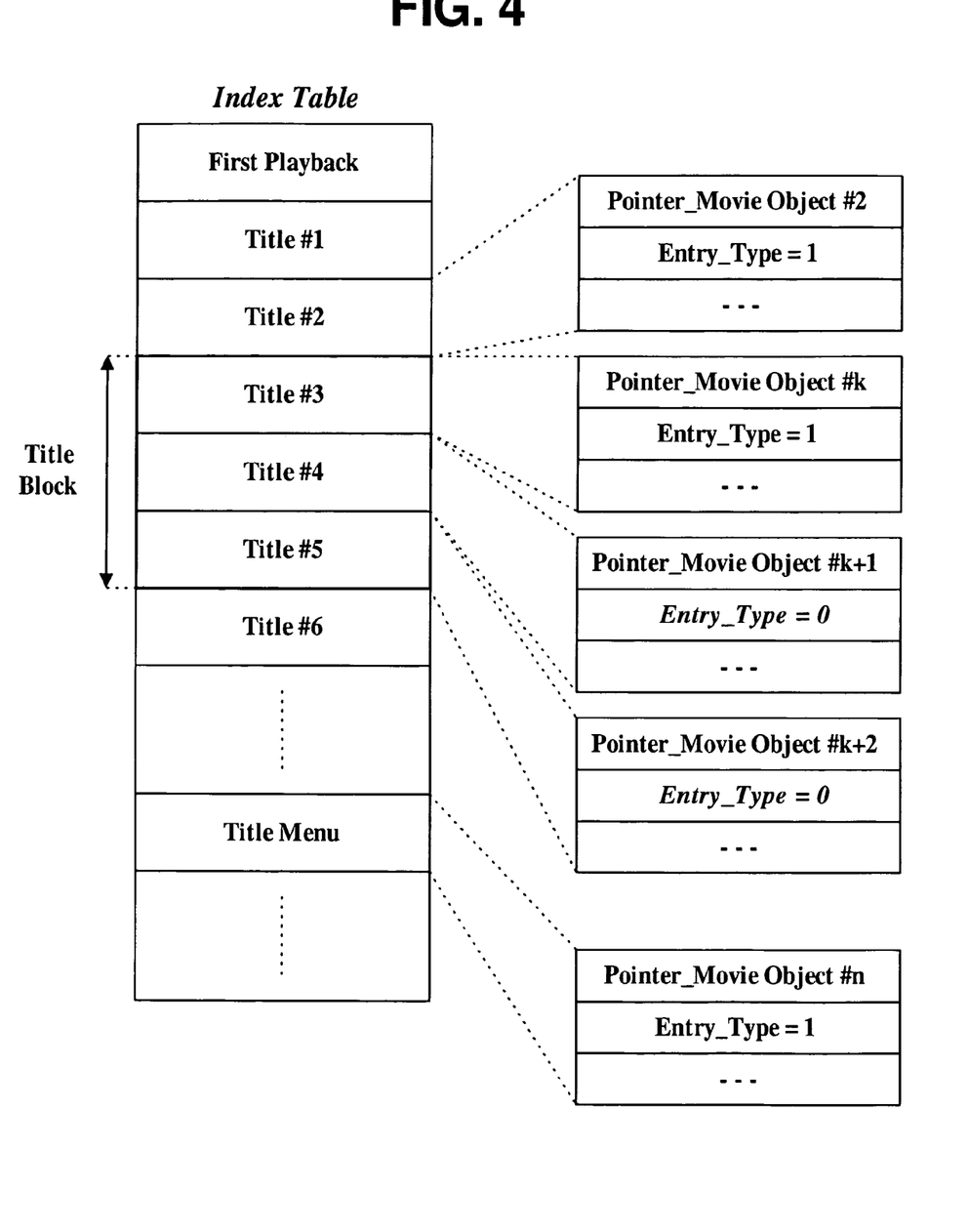
FIG. 4 shows a data structure related to management of reproduction of multiple reproduction path video data stream that is recorded on a read-only disk.

FIG. 4 shows a data structure, namely, title management information related to management of multiple reproduction path video data stream that is recorded as A/V clip files on physical data recording area in a read-only disk like BD-ROM.

An A/V data stream recorded on a BD-ROM is organized as multiple titles under the data structure of FIG. 4 according to the present invention. Furthermore, some of the multiple titles are grouped to a title block. The title block is associated with a part of the A/V data stream that has different reproduction paths, e.g., different parental levels.

An index table illustrated in FIG. 4 is one of the title management information. The index table includes first play information, information for each title, and menu information including, e.g., thumbnail information to show descriptive image of each title.

Each piece of the title information includes a pointer of movie object related thereto and entry type information. Each movie object is corresponding to a playlist that points to at least one video stream section and/or at least one A/V clip file.

And, the entry type information is indicative of type of a title. For example, in the illustrative case shown in FIG. 5 that the third to fifth titles 'Titles #3 to #5' are grouped to a single title block because they are assigned to mutually different reproduction paths, if the third title is for basic reproduction path, its entry type information is set to '1'. The title assigned to basic reproduction path is entry title of its title block.

Figure 5:
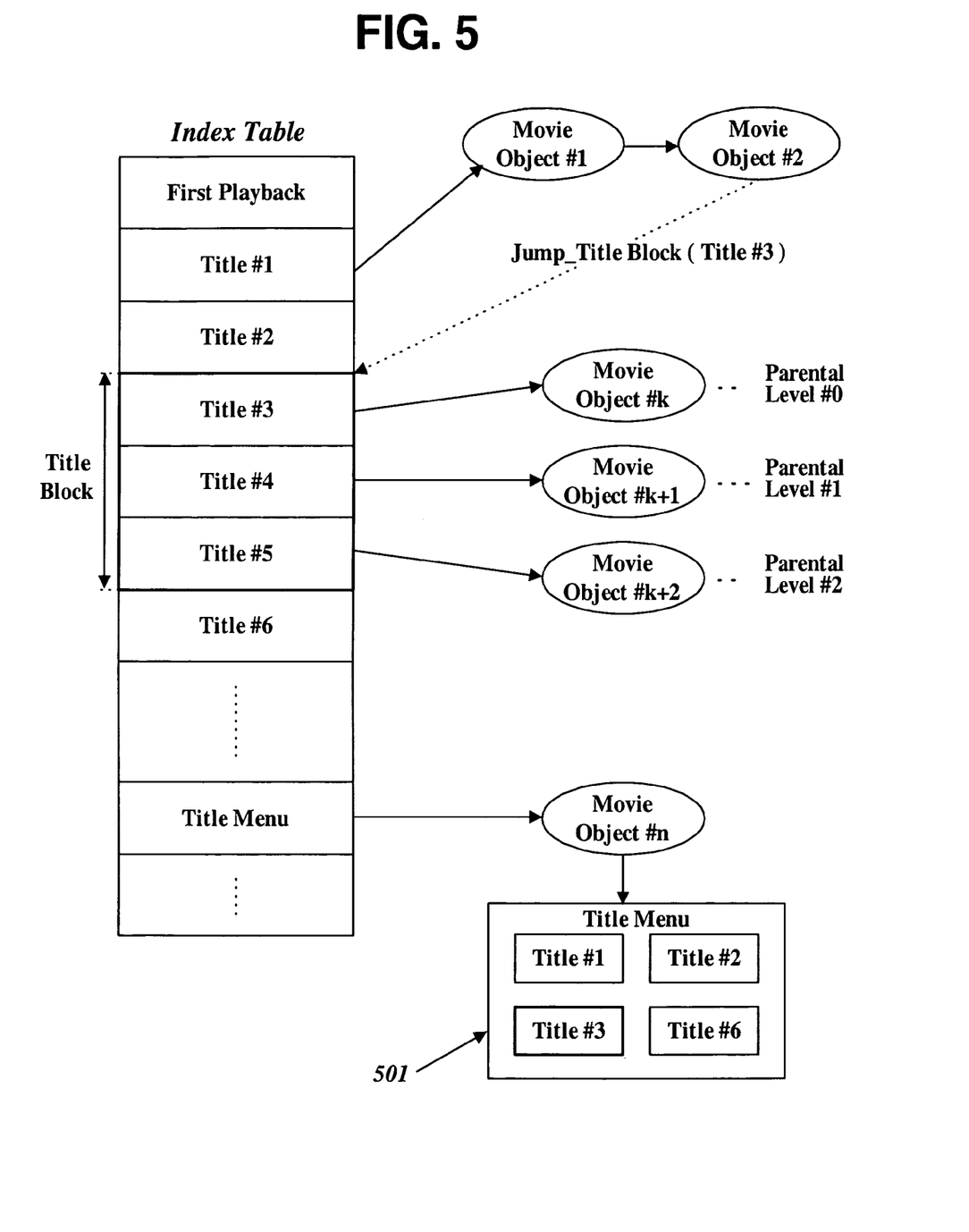
FIG. 5 shows a detailed example in which a title block is managed.

Other titles 'Titles 4 and 5' of the title block have entry type information of '0' which is indicative of non-entry, namely, only a member of title block. Independent titles, not allocated to any title block, have entry type information of '1'.

The title block including an entry title with its entry type=1 and at least one non-entry title with its entry type=0 is regarded as a single title when title jump is conducted and title menu items are displayed on a title menu. As an exemplary title jump case, if a jump to next title is requested while video data pertaining to the third title is reproduced, the fourth and the fifth title are skipped and the sixth title outside the title block is reproduced. Furthermore, a single menu item is provided for the three titles 'Titles #3 to #5' when a title selection menu 501 is displayed as shown in FIG. 5.

FIG. 5 shows a detailed example in which a title block is managed. In the example of FIG. 5, the third to the fifth title are associated with movie objects having multiple parental levels while the other titles are associated with movie objects having a unique parental level. Therefore, a movie object pointed by one title chosen from the title block in accordance with a selected parental level is reproduced.

For example, a title next to the second title pertains to a title block, therefore, a user selection for a parental level is requested after the first and the second title are sequentially reproduced. If a user selection is not entered for a limited time, a movie object 'Movie Object #k' associated with the basic title, namely, the third title whose entry type is '1' starts to be reproduced. If a certain parental level is selected, a move object associated with a title assigned to the selected level is reproduced. After reproduction of one title chosen from the title block is completed, a next title outside the title block, namely, the sixth title in the example of FIG. 5 starts to be reproduced without reproducing any title in the title block.

Figure 6:
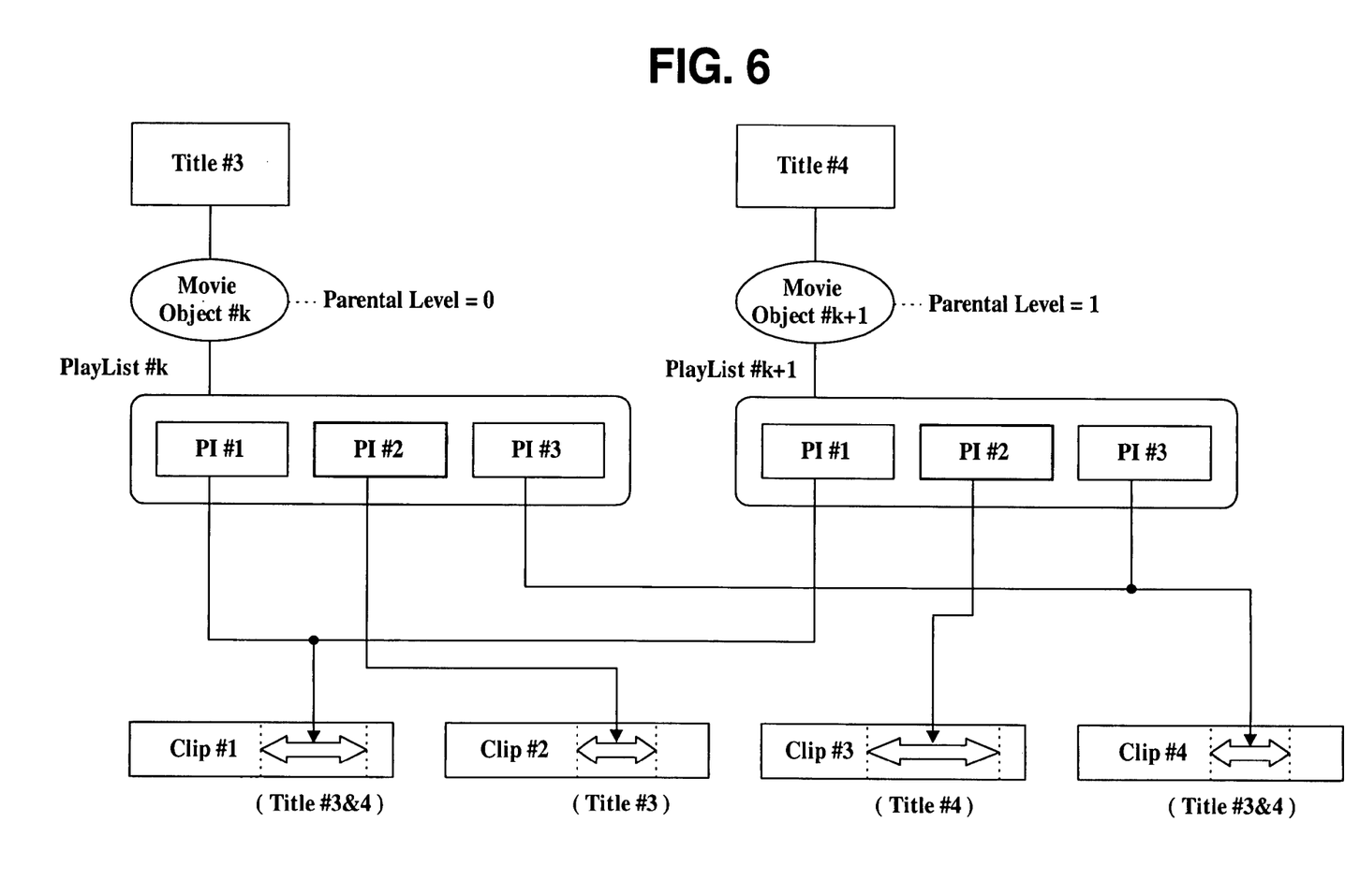
FIG. 6 shows a schematic relation between title information and a video data stream recorded on clip files for the example shown in FIG. 5.

FIG. 6 shows schematic relation between title information and a video data stream recorded in clip files for the example shown in FIG. 5. Each piece of title information includes a pointer of movie object and each move object is associated with a playlist as mentioned before. The playlist includes at least one playitem that refers to a part of an A/V data stream recorded in a clip file. In the example of FIG. 6, a single playlist includes three playitems. If a title is selected, one or several playitems are determined based on the chosen title information and A/V stream sections pointed by at least one playitem are reproduced sequentially.

In the example of FIG. 6, the third and the fourth title are '0' and '1', respectively in their parental level, and they share two A/V stream sections recorded in the clip files #1 and #4 while respectively referring to the other two A/V stream sections recorded in the clip files #2 and #3 through their second playitems. Therefore, if video data adequate to parental level '0' is recorded in the clip file #2 and other video data adequate to parental level '1' in the clip file #3 and they are assigned to different titles, a video data section intended for a chosen parental level can be reproduced through title selection.

On the other hand, menu data of the title menu included in the index table can be managed as a movie object. This movie object, as shown in FIG. 5, points to a data section containing necessary menu data. The menu data may be included in a video clip file or in a separate file other than a video clip file. When reproduction of titles recorded on a recording medium such as a BD-ROM is requested, a movie object 'Movie Object #n' pointed by a title menu is determined first based on the index table, namely, title management information and then corresponding menu data of the determined movie object is reproduced and displayed as a selection menu screen.

Figure 7:
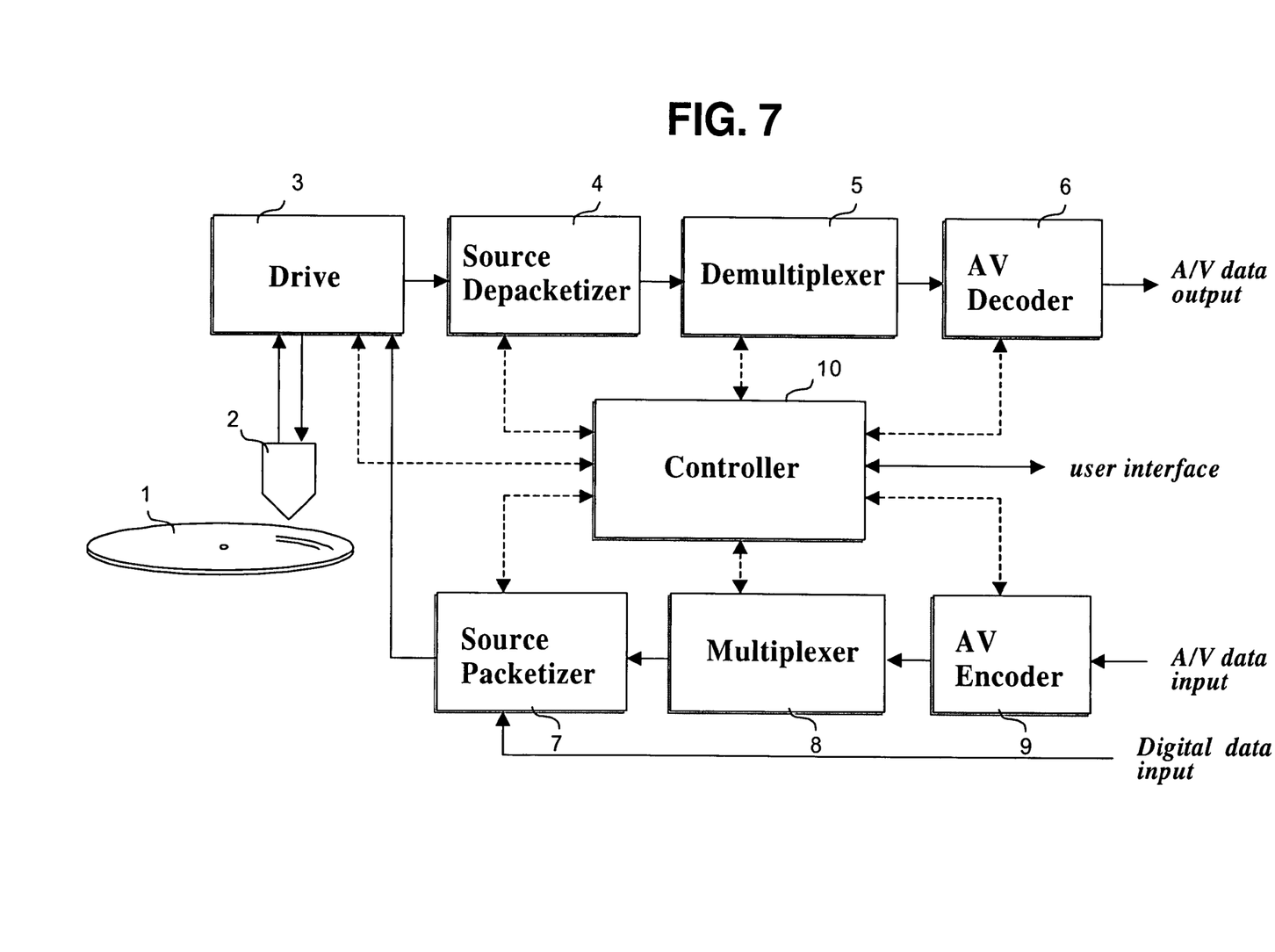
FIG. 7 illustrates a schematic diagram of an embodiment of an optical disk recording and reproducing apparatus according to the present invention.

FIG. 7 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the audio/video data being recorded on the optical disk. For example, based on information received via the user interface (e.g., instruction set saved on disk, provided over an intranet or internet by a computer system, etc.) the controller 10 controls the drive 3 to record the data structure of FIGS. 2 to 6 on the optical disk.

In the process of reproduction, the controller 10 controls the drive 3 to reproduce this data structure from the optical disk. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a reproduction path, namely, a parental level or a title to reproduce. This user input maybe specified, for example, via a menu based graphical user interface preprogrammed into the controller 10. Using the user input and the title management information reproduced from the optical disk, the controller 10 controls the reproduction of a movie object associated with the specified path, namely, parental level.

For example, if a title is chosen on the menu screen 501 of FIG. 5, management information for the chosen title are examined by the controller 10, and a video stream section pointed by the title information is reproduced. Afterwards, if the next title is the beginning of a title block, the controller 10 provides a parental level selection menu for the user. If a parental level is selected, the controller 10 determines a playlist based on the title information related with the selected parental level, searches for video stream sections associated with the determined playlist, and reproduces the video stream sections sequentially.

The reproduced source packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 7 has been described as a recording and reproducing apparatus, it will be understood that only a recording or only a reproducing apparatus may be provided using those portions of FIG. 7 providing the recording or reproducing function.

The present invention, disclosed with respect to a limited number of embodiments, provides a greater level of flexibility in the multi-path, e.g., multiple parental level reproduction of video data than previously available.

While the invention has been disclosed with respect to a limited number of embodiments, those skilled in the art, having the benefit of this disclosure, will appreciated numerous modifications and variations therefrom. It is intended that all such modifications and variations fall within the spirit and scope of the invention.

What is claimed is:

1. A non-transitory recording medium storing a data structure managing reproduction of multi-path video data by a reproducing apparatus, comprising:
   a data area storing the multi-path video data; and
   a management information area storing title management information,
   the title management information managing a plurality of titles, each title identifying a reproduction path of the multi-path video data for reproduction of the multi-path video data at the reproduction path,
   at least a first title of the titles being an entry title of a title block and at least a second title of the titles being a non-entry title of the title block, the first title defining a reproduction start point of the title block during a title jump, the title jump stopping reproduction of video data identified by the first title and beginning reproduction of video data identified by another of the titles, the title jump skipping video data identified by the second title.

2. The non-transitory recording medium of claim 1, wherein each of the titles has type information to identify whether the title is an entry title or not.

3. The non-transitory recording medium of claim 2, wherein titles not pertaining to the title block are specified to entry titles by the type information.

4. The non-transitory recording medium of claim 1, wherein the entry and non-entry titles pertaining to the title block are regarded as a single title when title jump is conducted and title selection menu is displayed.

5. The non-transitory recording medium of claim 1, wherein, if one title is not selected from the title block within a predetermined time, a video data section associated with a title in the title block specified to an entry title is reproduced.

6. The non-transitory recording medium of claim 1, wherein, if jump to a previous/next title is requested during reproduction of a title pertaining to the title block, another entry title adjacent to and not pertaining to the title block is reproduced.

7. The non-transitory recording medium of claim 1, wherein the different reproduction paths are assigned to different parental levels, respectively.

8. The non-transitory recording medium of claim 1, wherein each of the titles has information to access a playlist including at least one playitem that points to a part of the multi-path video data.

9. The non-transitory recording medium of claim 1, wherein the title management information includes title selection menu data or information to access title selection menu data.

10. A method of recording a data structure for managing reproduction of multi-path video data on a non-transitory recording medium, comprising:
    recording the multi-path video data in a data area on the non-transitory recording medium; and
    recording title management information on the non-transitory recording medium, wherein:
    the title management information manages a plurality of titles, each title identifying a reproduction path of the multi-path video data for reproduction of the multi-path video data at the reproduction path,
    at least a first title of the titles being an entry title of a title block and at least a second title of the titles being a non-entry title of the title block, the first title defining a reproduction start point of the title block during a title jump, the title jump stopping reproduction of video data identified by the first title and beginning reproduction of video data identified by another of the titles, the title jump skipping video data identified by the second title.

11. An apparatus for recording a data structure managing reproduction of multi-path video data on a recording medium, the apparatus comprising:
    a pickup configured to record data on the recording medium;
    an encoder configured to encode the multi-path video data; and a controller, operably coupled to the pickup, configured to control recording the encoded multi-path video data and title management information on the recording medium, the title management information managing a plurality of titles, each title identifying a reproduction path of the multi-path video data for reproduction of the multi-path video data at the reproduction path, at least a first title of the titles being an entry title of a title block and at least a second title of the titles being a non-entry title of the title block, the first title defining a reproduction start point of the title block during a title jump, the title jump stopping reproduction of video data identified by the first title and beginning reproduction of video data identified by another of the titles, the title jump skipping video data identified by the second title.

12. A method of reproducing a data structure managing reproduction of multi-path video data recorded on a non-transitory recording medium by a reproduction apparatus, the method comprising:

reproducing title management information from a management information area on the non-transitory recording medium; and reproducing the multi-path video data from a data area on the non-transitory recording medium based on the title management in formation, the title management information managing a plurality of titles, each title identifying a reproduction path of the multi-path video data for reproduction of the multi-path video data at the reproduction path, at least a first title of the titles being an entry title of a title block and at least a second title of the titles being a non-entry title of the title block, the first title defining a reproduction start point of the title block during a title jump, the title jump stopping reproduction of video data identified by the first title and beginning reproduction of video data identified by another of the titles, the title jump skipping video data identified by the second title.

13. The method of claim 12, wherein the entry and non-entry titles pertaining to the title block are regarded as a single title when the title jump is conducted and title selection menu is displayed.

14. The method of claim 13, further comprising the step of, if jump to a previous/next title is requested during reproduction of a title pertaining to the title block, reproducing another entry title adjacent to and not pertaining to the title block.

15. The method of claim 13, further comprising the step of displaying one title menu item for all titles pertaining to the title block when a title selection menu is outputted.

16. The method of claim 12, wherein, if one title is not selected from the title block within a predetermined time, a video data section associated with a title in the title block specified to an entry title is reproduced.

17. An apparatus for reproducing a data structure managing reproduction of multi-path video data recorded on a recording medium, the apparatus comprising:

a pickup configured to read data recorded on the recording medium;

a decoder configured to decode the reproduced data; and a controller, operably coupled to the pickup, configured to control reproducing title management information from the recording medium and the multi-path video data from the recording medium based on the title management information, the title management information managing a plurality of titles, each title identifying a reproduction path of the multi-path video data for reproduction of the multi-path video data at the reproduction path, at least a first title of the titles being an entry title of a title block and at least a second title of the titles being a non-entry title of the title block, the first title defining a reproduction start point of the title block during a title jump, the title jump stopping reproduction of video data identified by the first title and beginning reproduction of video data identified by another of the titles, the title jump skipping video data identified by the second title.

18. The apparatus of claim 17, wherein, if jump to a previous/next title is requested during reproduction of a title pertaining to the title block, the controller is configured to control the pickup to reproduce another entry title adjacent to and not pertaining to the title block.

19. The apparatus of claim 17, wherein the controller is configured to control the decoder to present one title menu item for all titles pertaining to the title block when outputting a title selection menu.

20. The apparatus of claim 17, wherein, if one title is not selected from the title block within a predetermined time, the controller configured to control the pickup to reproduce a video data section associated with a title in the title block specified to an entry title.

* * * * *